United States Patent [19]

Zep-Pey

[11] 4,247,341

[45] Jan. 27, 1981

[54] CONTINUOUS MASSECUITE VACUUM FILTERING SYSTEM

[76] Inventor: Chen Zep-Pey, No. 99-3, Kuo-San Rd., Sect. 1, Kaohsiung, Taiwan

[21] Appl. No.: 49,508

[22] Filed: Jun. 18, 1979

[51] Int. Cl.³ .............................................. C13F 1/04
[52] U.S. Cl. ........................................ 127/9; 127/2; 127/55; 127/63; 210/179
[58] Field of Search .................. 127/2, 9, 63; 210/179

[56] References Cited

U.S. PATENT DOCUMENTS

| 2,678,132 | 5/1954 | Beard, Jr. | 127/55 X |
| 3,756,411 | 9/1973 | Kracklauer | 210/179 |
| 3,756,855 | 9/1973 | Duchateau | 127/63 |
| 4,057,437 | 11/1977 | Kracklauer | 127/2 X |

*Primary Examiner*—Sidney Marantz
*Attorney, Agent, or Firm*—Holman & Stern

[57] ABSTRACT

A massecuite processing system of the type generally used in the separation of sugar crystals from molasses in the so called "High Grade Massecuites" produced in the process of making sugar from sugar cane and sugar beet. The massecuite is evenly spread over the perforated belt of a belt conveyor while a vacuum is maintained under the belt to aspirate the molasses through the belt into vacuum chambers located under the belt. The perforations of the belt are sized to prevent the aspiration of the sugar crystals with the molasses and in this way the sugar crystals are effectively separated from the molasses. The separated molasses is collected in the vacuum chambers from which it is transferred to a separately mounted molasses separating tank which is also under vacuum and from which the molasses is pumped to the molasses storage tanks generally used in sugar factories. The separated sugar crystals travelling with the moving belt are washed with hot water and steam afterwhich they are dried by means of a hot air stream and cooled by means of a stream of air at ambient temperature before being discharged for storage.

5 Claims, 1 Drawing Figure

CONTINUOUS MASSECUITE VACUUM FILTERING SYSTEM

BACKGROUND OF THE INVENTION

It is well known that in sugar factories the separation of sugar crystals and molasses from the socalled "High Grade Massecuites" obtained from the operation of vacuum pans is generally achieved in centrifugals having perforated baskets rotating at speeds of up to 1500 revolutions per minute. The use of these centrifugals has several disadvantages.

Centrifugals are usually driven by relatively powerful motors which consume a considerable amount of energy and, being generally operated in a discontinuous manner, the amperage fluctuations caused by the frequent starting and stopping of these powerful motors have a disturbing effect on the electrical systems of the factories.

The discontinuous nature of the operation of centrifugals generates an inherent loss of production capacity and necessitates complicated and expensive control systems when they are meant to be operated in an automatic fashion and absorbs a large amount of labor when they are operated manually.

The high rotational speed of centrifugals requires sophisticated components and frequent checks of the dynamic balance of the rotating components. Furthermore, the high centrifugal force applied to the sugar crystals tightly packs the crystals against the inner surface of the perforated basket and the scraping process necessary to dislodge the sugar crystals from the walls of the basket crushes some of the sugar crystals and the crushed crystals have a tendency to slip through the perforations of the basket together with the molasses thus defeating to some extent the separating function of the machine.

The high centrifugal force exerted on the sugar crystals tend to force the crystals into the perforations of the basket and it is necessary to dissolve these crystals at the start of each cycle of operation. The dissolved crystals appear as molasses rich in sugar content thus defeating to some extent the separating function of the machine.

As can be gathered from the preceding comments the reliance upon centrifugal force to acheive the separation of sugar crystals from molasses creates several problems and this invention is directed to the remedying of these disadvantages by the avoidance of the centrifugal principle in the separation of sugar crystals from molasses.

OBJECTS OF THE INVENTION

It is an object of this invention to provide a massecuite processing system which is continuous in operation and which relies on aspiration of the molasses by a vacuum instead of on the separation of molasses by centrifugal force as is generally used in the industry.

It is a further object of this invention to reduce the energy consumed in the processing of massecuites.

Other objects of this invention are to increase the efficiency of the separation of sugar crystals from the molasses of a massecuite to avoid the violent electrical current fluctuations usually associated with the processing of massecuites and to reduce the operating costs of massecuite processing.

SUMMARY OF THE INVENTION

In carrying out this invention, I provide a system to separate sugar crystals from the molasses of a massecuite, characterised by the spreading of the massecuite on a perforated belt travelling horizontally, by the maintaining of a vacuum under the belt to aspirate the molasses content of the massecuite, by the collection of the separated molasses under vacuum and the pumping of the said molasses to the molasses storage tanks of the factory.

The system of the invention is also characterised by the cleaning, drying and cooling of the sugar crystals remaining of the belt whilst the said belt travels toward the discharge end of the vacuum filter.

The crystals cleaning process is carried out by sets of hot water and steam sprays directed downwards and located above the belt and also directly above the chambers which maintain vacuum under the belt.

Drying of the sugar crystals is carried out by the blowing of a stream of hot air through the belt from underneath the belt and through the layer of sugar crystals lying on top of the belt.

Cooling of the sugar crystals is carried out by the blowing of a stream of air at ambient temperature through the belt from the underneath of the belt and through the layer of sugar crystals lying on top of the belt.

DESCRIPTION OF A PREFERRED EMBODIMENT

Figure 1:
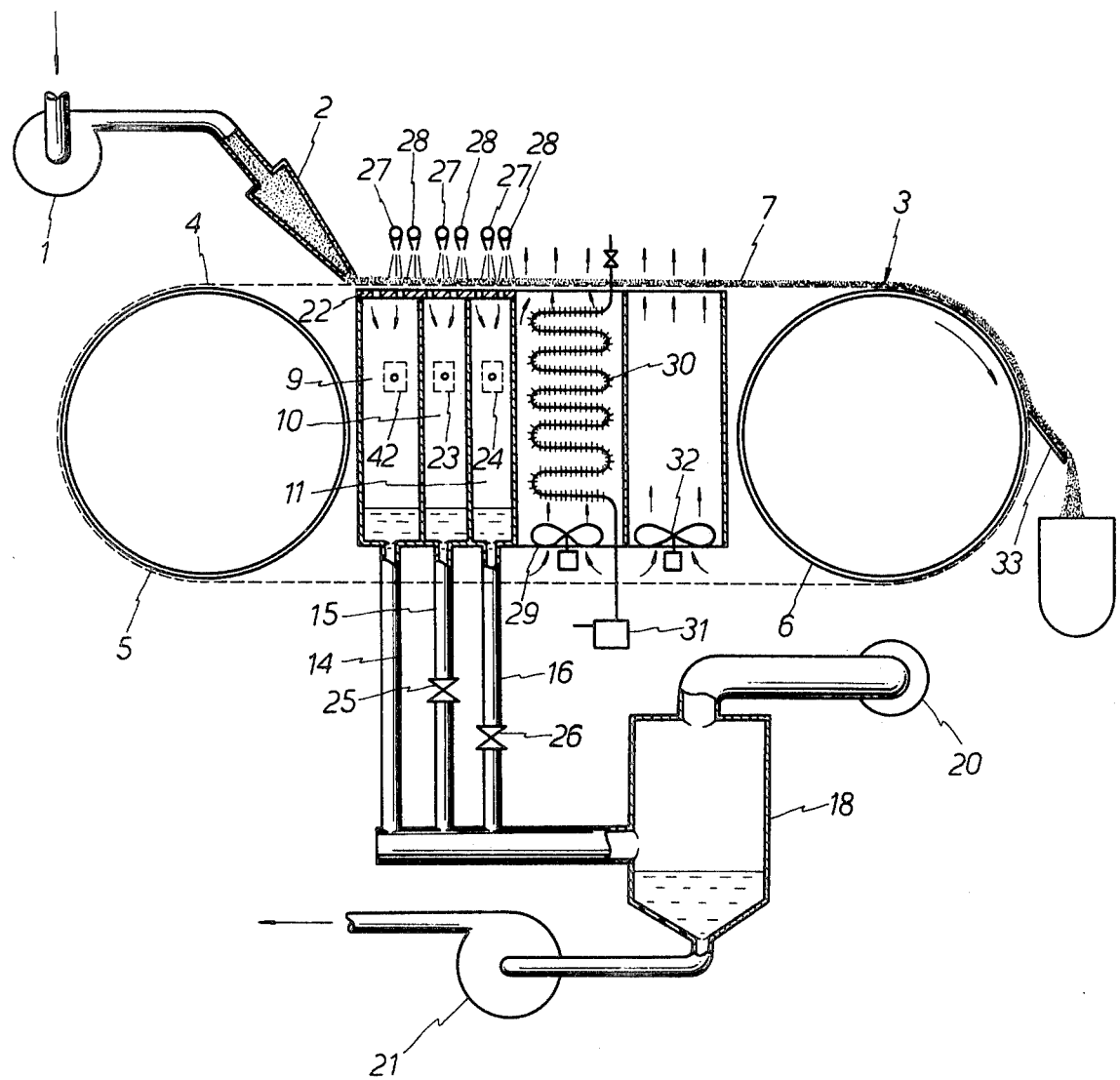
FIG. 1 is a pictorial view, in part section, illustrating apparatus constructed in accordance to the preferred embodiment of the invention.

Referring to FIG. 1 with greater particularity, massecuite is pumped from the massecuite receiver (Not shown on the drawing) which is generally available in sugar factories, by means of metering pump 1 of the type commonly used, into nozzle 2 which lays a uniform layer of massecuite 7 over perforated belt 4 of vacuum filter 3. Whilst FIG. 1 shows that the spreading of the massecuite over belt 4 is acheived by the use of nozzle 2, other means of spreading the massecuite can be employed such as the use of an overflowing trough.

Belt 4 is of the endless type and travels around tail drum 5 and head drum 6 which is driven by any of the several conventional types of drive commonly used in the industry.

As massecuite 7 spreads over belt 4, the molasses contained in the massecuite effectively seals the perforations of belt 4 which in turn seals perforated plate 22 forming the top cover of vacuum chambers 9, 10 and 11, thus allowing vacuum pump 20 to create a vacuum inside vacuum chambers 9, 10 and 11. The vacuum thus created under belt 4 aspirates the molasses through the perforations of belt 4, through the perforations of plate 22 and into vacuum chambers 9, 10 and 11.

The sugar crystals contained in massecuite 7 are also subject to the aspiration force of the vacuum created under belt 4 but are retained on the upper surface of belt 4 since the perforations of belt 4 are of a smaller size than the size of the sugar crystals.

The molasses aspirated into vacuum chambers 9, 10 and 11 flows by gravity through pipes 14, 15 and 16 and through manifold 17 into tank 18 which is connected at the top with vacuum pump 20 and at the lower end to molasses pump 21. When reading this description it will be apparent that atmospheric air is also aspirated together with the molasses under certain circumstances and the purpose of tank 18 is to separate the air from the molasses and to direct each of these two components to their respective destinations. The air is directed to and exhausted to atmosphere by vacuum pump 20, the molasses is directed to and conveyed by molasses pump 21 into the molasses storage tanks of the factory (not shown in the drawing)

Perforated plate 22 covering vacuum chambers 9,10 and 11 provides support to belt 4 as said belt is pulled in a downward direction under the influence of the vacuum created in vacuum chambers 9,10 and 11.

Although FIG. 1 illustrates a vacuum filter having three separate vacuum chambers 9, 10 and 11; this number can be increased or decreased to suit the capacity desired from vacuum filter 3.

Changes in the degree of vacuum obtained in vacuum chambers 9,10 and 11 are sensed by vacuum sensing devices 42, 23 and 24 which are each connected to corresponding vacuum chambers 9,10 and 11. Said sensing devices initiate the opening of corresponding control valves 25 and 26 in the manner described in the following paragraphs.

During the initial starting of vacuum filter 3 after each shut down, there is no massecuite on belt 4 and therefore atmospheric air is freely aspirated by vacuum pump 20 into vacuum chamber 9. As a result of the aspiration of air into vacuum chamber 9, a very low value of vacuum prevails in said vacuum chamber. Sensing device 42 is designed to keep control valve 25 in the closed position under low vacuum conditions. With control valve 25 in the closed position, vacuum chamber 10 is isolated from the influence of vacuum pump 20 and said vacuum chamber is therefore subjected to atmospheric pressure. Similarly, vacuum sensing device 23 which is connected to vacuum chamber 10 senses a no-vacuum condition causes control valve 26 to assume a closed position thus isolating vacuum chamber 11 also from the influence of vacuum pump 20.

As belt 4 moves forward, laden with massecuite, the perforations of belt 4 and those of plate 22 are gradually obstructed causing a corresponding gradual decrease in the amount of air aspirated into vacuum chamber 9 and a corresponding gradual increase in the valve of the vacuum existing in vacuum chamber 9. The increasing value of the vacuum in turn causes an increasing quantity of molasses to be aspirated into vacuum chamber 9 until the molasses is sufficiently exhausted from the massecuite to create interstices between the sugar crystals through which air is drawn into the vacuum chamber 9. The aspiration of air through the layer of sugar crystals has a tendency to lower the value of the vacuum prevailing in vacuum chamber 9 and therefore a condition of equilibrium is reached between the massecuite flow rate, the degree of obstruction of the perforations of plate 22, the amount of air aspirated into vacuum chamber 9 and the value of the vacuum in said vacuum chamber.

If the massecuite flow rate is increased to the point that the amount of molasses passing over vacuum chamber 9 is greater than the amount of molasses which can be aspirated into said vacuum chamber, interstices do not appear between the sugar crystals, air is not aspirated through the sugar layer and the value of the vacuum in vacuum chamber 9 rises until sensing device 42 causes control valve 25 to open thus connecting vacuum chamber 10 to the influence of vacuum pump 20.

Similarly, if the massecuite flow rate is too high to reach an equilbrium condition with the combined operation of vacuum chambers 9 and 10, sensing device 23 brings vacuum chamber into operation also.

Whilst the operation of the vacuum filter under conditions of increasing massecuite flow rates has been considered in the preceding paragraphs, a similar type of operation occurs in the case of decreasing flow rates. For example, assuming that vacuum filter 3 is operating with vacuum chambers 9, 10 and 11 connected to the vacuum source, as the massecuite flow rate is decreased, a larger flow rate of atmospheric air penetration occurs in vacuum chamber 11 for the reasons described previously, causing a lowering of vacuum value in said vacuum chamber until a predetermined high vacuum value is reached, at which sensing device 24 causes control valve 26 to close, thus leaving only vacuum chambers 9 and 10 connected to the vacuum source. Similarly, upon further decrease of the massecuite flow rate, sensing device 23 causes control valve 25 to close thus leaving only vacuum chamber 9 connected to the vacuum source.

In view of the viscous nature of the molasses in a massecuite, the molasses coating the individual sugar crystals, after the aspiration of the bulk of the molasses from the massecuite has taken place, cannot be removed by the aspiration process alone. For that reason, steam jets 27 and heated water jets 28 are sprayed over massecuite 7 directly above each vacuum chamber 10 and 11. In a preferred embodiment of the invention the said steam and water jets are brought into operation simultaneously with the opening of corresponding control valves 25 or 26 as the case may be, using the commonly known automatic control systems available to the industry to acheive that purpose. When the control valves are opening, the jets are brought into operation and when the control valves are closing, the jets are made inoperative.

As the clean sugar carried forward by belt 4 travels beyond the ultimate vacuum chamber, the said crystals are subjected to the drying action of a stream of heated air forced through belt 4 and through the sugar crystal layer, from the underneath of said belt, by means of fan 29 aspirating atmospheric air and forcing the said air through steam air heater 30.

The cleaned sugar crystals carried by belt 4 are cooled by means of a stream of air at ambient temperature blown by fan 32 through belt 4 and through the layer of sugar crystals carried by said belt, from the underneath of said belt.

In this preferred embodiment of the invention, fans 29 and 32 are mounted on vacuum filter 3 and the heating medium used on the air blown by fan 29 is a steam. However, fans 29 and 32 can equally be mounted separately from the vacuum filter and the air from said fans ducted to said vacuum filter with equally good results. An air-heating medium other than steam can also be used. In the case of the steam air heater of FIG. 1, the condensed steam is removed by means of steam trap 31.

The cleaned, dried and cooled sugar crystals are separated from belt 4 at the discharge end of vacuum filter 3 by means of scraper 33 and discharged into sugar conveyor 34 which is not part of this invention.

While this invention has been described in conjunction with a preferred embodiment thereof, it is obvious that modifications and changes therein may be made by those skilled in the art, particularly with regard to the described system of automatic control, without departing from the spirit and scope of this invention, as defined by the claims appended hereto Having described my invention, I claim:

1. In a system for the continuous separation of sugar crystal from molasses of massecuites obtained from the operation of vacuum pans in sugar factories;

a belt conveyor with perforated conveyor belt having openings smaller than sugar crystals, with means of metering and spreading an even and regular layer of massecuite over the conveyor belt, a rigid perforate surface, means of applying a vacuum under the conveyor belt and under said rigid perforate surface to aspirate the molasses from the massecuite, means of collecting and pumping the separated molasses to the plant molasses storage tanks and means of scraping the sugar crystals from the conveyor belt.

2. In a system defined by claim 1, wherein the means of applying vacuum under the conveyor belt and perforate surface consists of a plurality of vacuum chambers each connected to a source of vacuum by valves actuated by means to sense vacuum in an upstream vacuum chamber.

3. In a system defined by claim 1, including means of cleaning the sugar crystals by steam and heated water sprays.

4. In a system defined by claim 1 including means of drying the sugar crystals by means of a stream of heated air.

5. In a system defined by claim 1, including means of cooling the sugar crystals by means of a stream of air at ambient temperature.

* * * * *